(12) United States Patent
Cradick et al.

(10) Patent No.: US 8,261,199 B2
(45) Date of Patent: Sep. 4, 2012

(54) BREAKPOINT IDENTIFICATION AND PRESENTATION IN VIRTUAL WORLDS

(75) Inventors: Ryan Kirk Cradick, Rochester, MN (US); Zachary Adam Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 11/872,932

(22) Filed: Oct. 16, 2007

(65) Prior Publication Data

US 2009/0100353 A1   Apr. 16, 2009

(51) Int. Cl.
*G06F 3/048* (2006.01)
(52) U.S. Cl. ........................................ 715/757
(58) Field of Classification Search .................. 715/757
See application file for complete search history.

(56) References Cited

U.S. PATENT DOCUMENTS

| | | | |
|---|---|---|---|
| 5,400,254 A | 3/1995 | Fujita | |
| 5,671,381 A * | 9/1997 | Strasnick et al. | 715/848 |
| 6,097,393 A * | 8/2000 | Prouty et al. | 345/419 |
| 6,345,295 B1 | 2/2002 | Beardsley et al. | |
| 6,811,490 B2 * | 11/2004 | Rubin | 463/43 |
| 6,833,828 B1 | 12/2004 | Wininger | |
| 7,055,109 B2 | 5/2006 | Boden et al. | |
| 7,363,443 B2 * | 4/2008 | Rubin | 711/159 |
| 7,397,464 B1 * | 7/2008 | Robbins et al. | 345/173 |
| 2002/0140732 A1 * | 10/2002 | Tveskov | 345/763 |
| 2002/0174416 A1 * | 11/2002 | Bates et al. | 717/128 |
| 2003/0114227 A1 * | 6/2003 | Rubin | 463/43 |
| 2004/0139143 A1 | 7/2004 | Canakapalli et al. | |
| 2004/0154040 A1 * | 8/2004 | Ellis | 725/58 |
| 2005/0090315 A1 * | 4/2005 | Pehr Rubin | 463/43 |
| 2005/0289193 A1 * | 12/2005 | Arrouye et al. | 707/200 |
| 2006/0148571 A1 * | 7/2006 | Hossack et al. | 463/43 |
| 2007/0067583 A1 | 3/2007 | Zohar et al. | |
| 2008/0009345 A1 * | 1/2008 | Bailey et al. | 463/29 |
| 2008/0146338 A1 * | 6/2008 | Bernard et al. | 463/42 |
| 2008/0172635 A1 * | 7/2008 | Ross et al. | 715/826 |
| 2008/0261702 A1 * | 10/2008 | Rubin | 463/43 |
| 2008/0300049 A1 * | 12/2008 | Anderson et al. | 463/25 |
| 2009/0156299 A1 * | 6/2009 | Anderson et al. | 463/25 |
| 2009/0233771 A1 * | 9/2009 | Quatrochi et al. | 482/9 |
| 2010/0083107 A1 * | 4/2010 | Allen et al. | 715/700 |

OTHER PUBLICATIONS

Softpedia 3.5 G-Hotkey http://web.archive.org/web/20070809130325/http://www.softpedia.com/get/System/OS-Enhancements/G-Hotkey.shtml, Aug. 9, 2007.*

* cited by examiner

*Primary Examiner* — William Bashore
*Assistant Examiner* — Henry Orr
(74) *Attorney, Agent, or Firm* — Patterson & Sheridan LLP (57) ABSTRACT

One embodiment of the invention provides a method to allow a user to navigate through a virtual environment using breakpoints. Each breakpoint may store a context of a virtual location within the virtual world, recorded for the moment in time when the breakpoint was created. Further, in a persistent virtual world, the user's avatar may be restored to a given breakpoint location, as well as restoring elements of the virtual world, based on what was present within the virtual world when the breakpoint was created.

23 Claims, 9 Drawing Sheets

BREAKPOINT IDENTIFICATION AND PRESENTATION IN VIRTUAL WORLDS

BACKGROUND OF THE INVENTION

1. Field of the Invention

The field of the invention relates to virtual worlds, and more specifically to breakpoint identification and presentation in virtual worlds.

2. Description of the Related Art

A virtual world is a simulated environment in which users may inhabit and interact with one another via avatars. An avatar generally provides a graphical representation of an individual within the virtual world environment. Avatars are usually presented to other users as two or three-dimensional graphical representations of humanoids. Multiple users "enter" a virtual world by logging on to a central server(s), and interact with one another through the actions of their avatars. The actions of a given avatar are controlled by the corresponding individual typically using a mouse and keyboard. Virtual worlds provide an immersive environment with an appearance typically similar to that of the real world, with real world rules such as gravity, topography, locomotion, real-time actions, and communication. Communication may be in the form of text messages sent between avatars, but may also include real-time voice communication.

Virtual worlds may be persistent between times when a given user is logged on. A persistent world provides an immersive environment (e.g., a fantasy setting used as a setting for a role-playing game) that is generally always available, and virtual world events happen continually, regardless of the presence of a given avatar. Thus, unlike more conventional online games or multi-user environments, the plot and events within a virtual world continue to develop even while some of the members are not actively playing their characters.

SUMMARY OF THE INVENTION

One embodiment of the invention includes a method of creating a breakpoint associated with an avatar in a virtual world. The method may generally include retrieving a user profile associated with the avatar. The user profile may specify criteria for setting a breakpoint. The method may further include monitoring the avatar interacting with elements of the virtual world. Upon determining that the monitored interactions of the avatar satisfy the criteria, a then existing location of the avatar within the virtual world and a context of one or more elements proximate to the avatar present in the virtual world may be captured, and the then existing location of the avatar within the virtual world and the context of one or more elements present in the virtual world for the breakpoint may be stored.

Another embodiment of the invention includes a computer-readable storage medium containing a program configured to perform an operation for creating a breakpoint associated with an avatar in a virtual world. The operation may generally include retrieving a user profile associated with the avatar. The user profile may specify criteria for setting a breakpoint. The operation may further include monitoring the avatar interacting with elements of the virtual world Upon determining that the monitored interactions of the avatar satisfy the criteria, a then existing location of the avatar within the virtual world and a context of one or more elements proximate to the avatar present in the virtual world may be captured, and the then existing location of the avatar within the virtual world and the context of one or more elements present in the virtual world for the breakpoint may be stored.

Still another embodiment of the invention includes a system having a processor and a memory. The memory may include a virtual world program configured to provide an immersive virtual world, which when executed on the processor is configured to generate the virtual world, wherein the virtual world defines a virtual space configured to allow a plurality of avatars to interact with content elements included in the virtual world and with one another, and wherein a user profile associated with an avatar specifies criteria for setting a breakpoint for the avatar. The memory may also include a breakpoint manager program configured to retrieve the user profile associated with the avatar, monitoring the avatar interacting with elements of the virtual world. Upon determining that the monitored interactions of the avatar satisfy the criteria, the breakpoint manager may be further configured to capture a then existing location of the avatar within the virtual world and a context of one or more elements proximate to the avatar present in the virtual world and to store the then existing location of the avatar within the virtual world and the context of one or more elements present in the virtual world.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

As is known, users may view web pages within a browser and navigate to different web pages by clicking on links or typing in uniform resource locator addresses (URLs). Using the web browser, users typically return to previously visited web pages using "back" or "forward" buttons, or clicking on links within a browser history menu. Unlike the page-to-page navigation of the 2D environment, avatar navigation within a virtual world is much more fluid For example, while a virtual world typically provides a universe with many different locations, users generally have the freedom to move their avatars throughout any one location by walking, running, even flying. Accordingly, breakpoints are not as readily identifiable in the virtual world as they are in the 2D environment. Therefore, returning to a desired area requires a different approach.

Users may have their avatars back up, or re-trace their steps. However, re-tracing one's steps can be tedious, and even prove impossible if a user does not remember the path back to a desired location. Further, virtual worlds are dynamic, and when a user returns to a location in a virtual world, the scene may have changed. For example, other avatars may have come and gone from the location. There may be changes in scenery; objects may have been moved, etc.

Embodiments of the invention provide a method to allow a user to navigate through a virtual environment using breakpoints. Each breakpoint may contain a context of a virtual location within the virtual world, recorded for the moment in time when the user's avatar occupied the location. Further, in persistent virtual worlds, embodiments of the invention may restore the avatar to a breakpoint location, as well as restoring elements of the virtual world, based on what was present when the breakpoint was created. Embodiments of the invention may also present a snapshot of a breakpoint to the user, visually displaying a virtual location as seen by the user at the moment the breakpoint was captured.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. The software in these embodiments may be deployed in these embodiments using any suitable software fulfillment technique, including without limitation: (i) distributing non-rewritable storage media (e.g., CD-ROM disks readable by a CD-ROM drive or DVD-ROM disks readable by a DVD-ROM drive); (ii) storing a program on a network accessible storage media (e.g., a public website, a public FTP site), receiving a request for the program, and transmitting the program to the requester over the network. Aspects of these embodiments may further include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
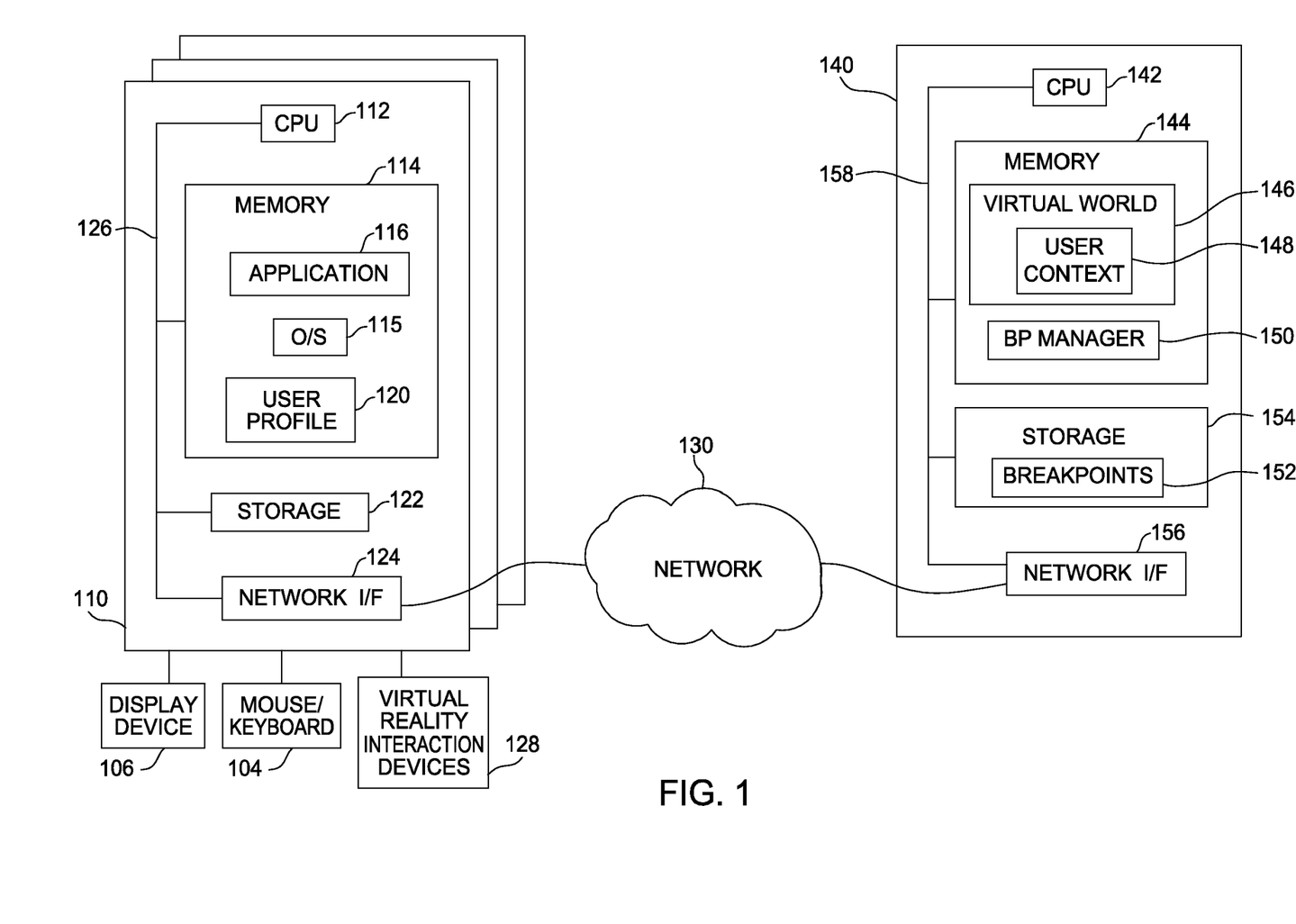
FIG. 1 is a block diagram illustrating a system for identifying and presenting breakpoints in a virtual world, according to one embodiment of the invention.

FIG. 1 is a block diagram illustrating a system 100 for identifying and presenting breakpoints in a virtual world, according to one embodiment of the invention. As shown, system 100 includes client computers 110, a network 130, and a server computer 140. Client computer 110 and server computer 140 are intended to represent any type of computer, computer system or other programmable electronic device, including a portable computer, an embedded controller, a PC-based server, a minicomputer, a midrange computer, a mainframe computer, and other computers adapted to support embodiments of the invention. The network 130 could be any communications or computer network, or collection of networks capable of facilitating communications between the client 110 and the server 140. In one embodiment, the network 130 is the internet.

As shown, client 110 includes a central processing unit (CPU) 112, which obtains instructions and data via a bus 126 from a main memory 114 and storage 122. The processor 112 could be any processor used to perform an embodiment the invention. The main memory 114 is any memory sufficiently large to hold the necessary programs and data structures. The main memory 114 could be one or a combination of memory devices, including Random Access Memory, nonvolatile or backup memory, (e.g., programmable or flash memories, read-only memories, etc.). In addition, main memory 114 and storage 122 may include memory physically located elsewhere in a client 110, for example, on another computer coupled to the client 110. Finally, client 110 is connected to the network 130 by a network interface 124.

Main memory 114 includes an operating system 115. Operating system 115 is the software used for managing the operation of the client 110. Examples of operating systems 115 include UNIX, a version of the Microsoft Windows® operating system, and distributions of the Linux® operating system. (Note, Linux is at trademark of Linus Torvalds in the United States and other countries.) Illustratively, main memory 114 also includes a client application 116 and a user profile 120.

In one embodiment, client application 116 provides a software program that allows a user to connect to a virtual world 146, and once connected, to explore and interact with virtual world 146. Further, client application 116 may be configured to generate and display a visual representation of the user within the immersive environment, generally referred to as an avatar.

The user's avatar is generally visible to other users in the virtual world, and the user may view avatars representing the other users. The client application 116 may also be configured to transmit the user's desired actions to a virtual world 146 on server 140. The client application 116 may also be configured to generate and present the user with a display of the virtual world 146. Such a display generally includes content from the virtual world 146 determined from the avatar's line of sight at any given time. For the user, the display may include the avatar of that user or may be a camera eye where the user sees the virtual world 146 through the "eyes" of their avatar.

The user may view the virtual world 146 using a display device 106, such as an LCD or CRT monitor display, and interact with the client application using a mouse and keyboard 104. Further, in one embodiment, the user may interact with client application 116 and virtual world 146 using a variety of virtual reality interaction devices 128. For example, the user may don a set of virtual reality goggles that have a screen display for each lens. Further, the goggles could be equipped with motion sensors that cause the view of the virtual world 146 presented to the user to move based on the head movements of the individual. As another example, the user could don a pair of gloves configured to translate motion and movement of the user's hands into avatar movements within the virtual world 146 environment. Of course, embodiments of the invention are not limited to these examples and one of ordinary skill in the art will readily recognize that the invention may be adapted for use with a variety of devices configured to present the virtual world 146 to the user and to translate movement/motion or other actions of the user into actions performed by the avatar representing that user within virtual world 146.

The user profile 120 may include criteria used to define a breakpoint 152. Criteria can encompass a number of conditions within a virtual world 146, including an avatar's actions. In one embodiment, a breakpoint is created when the conditions within a virtual world match the criteria specified in user profile 120. Examples of criteria include movement (or a lack thereof), clicking on links or objects in the virtual world 146 or otherwise interacting with elements of the virtual world 146 in specified ways, communicating with other avatars or objects in the virtual world 146, and viewpoint orientation.

The breakpoint manager 150 on server 140 interacts with the user profile 120 to determine when to create a breakpoint 152.

As shown, server 140 includes a central processing unit (CPU) 142, which obtains instructions and data via a bus 158 from a main memory 144 and storage 154. The processor 142 may be any processor used to perform the methods of the invention. The main memory 144 is any memory sufficiently large to hold the necessary programs and data structures. Main memory 144 could be one or a combination of memory devices, including Random Access Memory, nonvolatile or backup memory, (e.g., programmable or Flash memories, read-only memories, etc.). In addition, main memory 114 and storage 154 may be considered to include memory physically located elsewhere in a server 140, for example, on another computer coupled to the server 140 via bus 158. Server 140 is connected to the network 130 by a network interface 156.

Illustratively, memory 144 includes virtual world 146 and a breakpoint manager 150. As stated, virtual world 146 may be a software application that allows users to explore and interact with the immersive environment provided by virtual world 146. The virtual world 146 may define a virtual "space" representing, for example, a street, a room, a town, a building with multiple floors, a forest, or any other configuration of a virtual space. Illustratively, virtual world 146 includes user context 148.

User context 148 contains data describing the current set of elements and avatars within a virtual location of a virtual world, and the location being currently occupied by the user's avatar. In an example of user context 148 from a virtual location such as a virtual shopping center, the user context 148 may include the interior of a virtual store, the items for sale in the store, sales clerk avatars, a manager avatar, and other "shopping" avatars. The manager avatar corresponds to a user operating the virtual store. The elements for sale may include both elements of the virtual world (e.g., virtual clothing that a user may purchase for their avatar), and may also include a shopping environment that allow the user to purchase real-world goods or services.

According to some embodiments, user context 148 may include unseen elements and avatars. In the example of the virtual store, the user context 148 may also include other floors or departments of the store with their respective sales items and avatars. Other examples of unseen avatars and elements could include elements from virtual fantasy worlds, such as invisible avatars, trap doors, and other unseen, but potentially "active" elements of the environment provided by virtual world 146.

Storage 154 represents both volatile and non-volatile memory storage. In addition, storage 154 may include memory physically located elsewhere, for example, any storage capacity used as virtual memory or a mass storage device or on another computer coupled to the server 140 via bus 158 (e.g., an attached NFS server). Illustratively, storage 154 includes breakpoints 152. Breakpoints 152 include the requisite user context 148 that allows the breakpoint manager 150 to restore an avatar to a previously visited location or present a snapshot of the location as seen by the user at the moment the breakpoint 152 was recorded.

The breakpoint manager 150 may be configured to monitor an avatar's behavior within a virtual world 146 and identify breakpoints 152. Further, the breakpoint manager 150 may present or restore a given breakpoint 152 at a user's request. When the conditions within the virtual world 146 satisfy the criteria specified by a given user profile 120, the breakpoint manager 150 may identify the current user context 148 as a breakpoint 152 for the user associated with the user profile 120, and store a breakpoint 152 capturing the current user context 148. When the user subsequently requests the breakpoint 152 to be restored, the breakpoint manager 150 may transmit the context information for the breakpoint 152 to the virtual world 146, which may then restore the user's avatar to the position specified for the breakpoint 152.

Figure 2A:
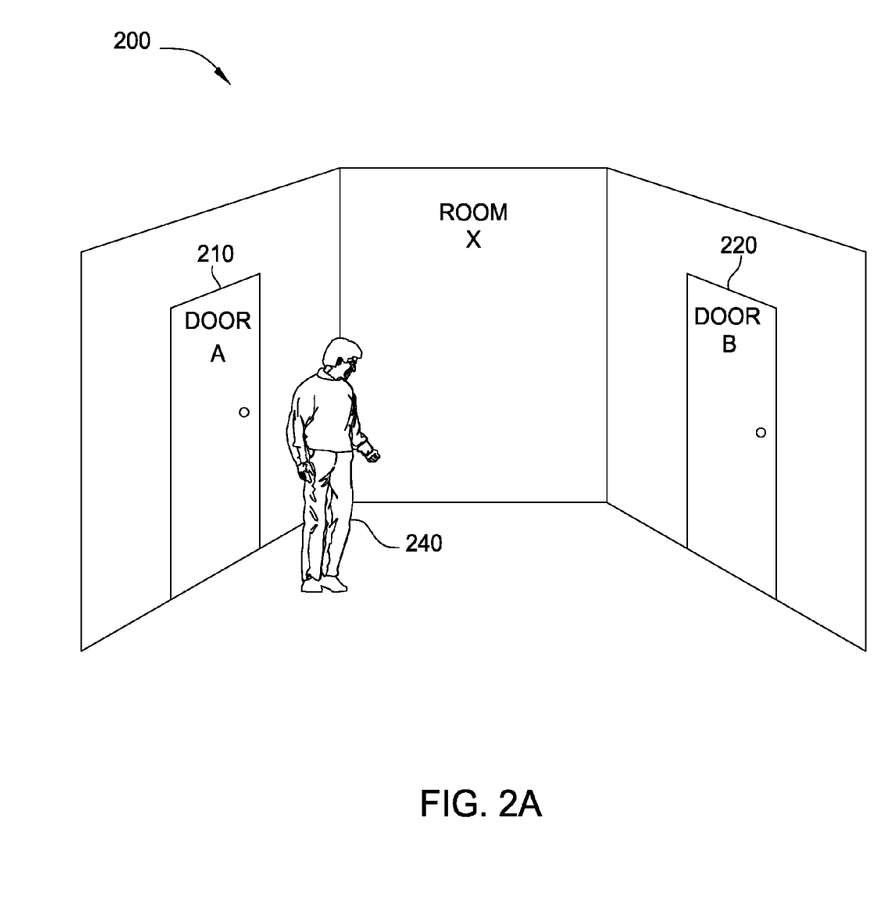
FIG. 2A illustrates an example scenario of identifying and presenting a breakpoint in a virtual world, according to one embodiment of the invention.
Figure 2B:
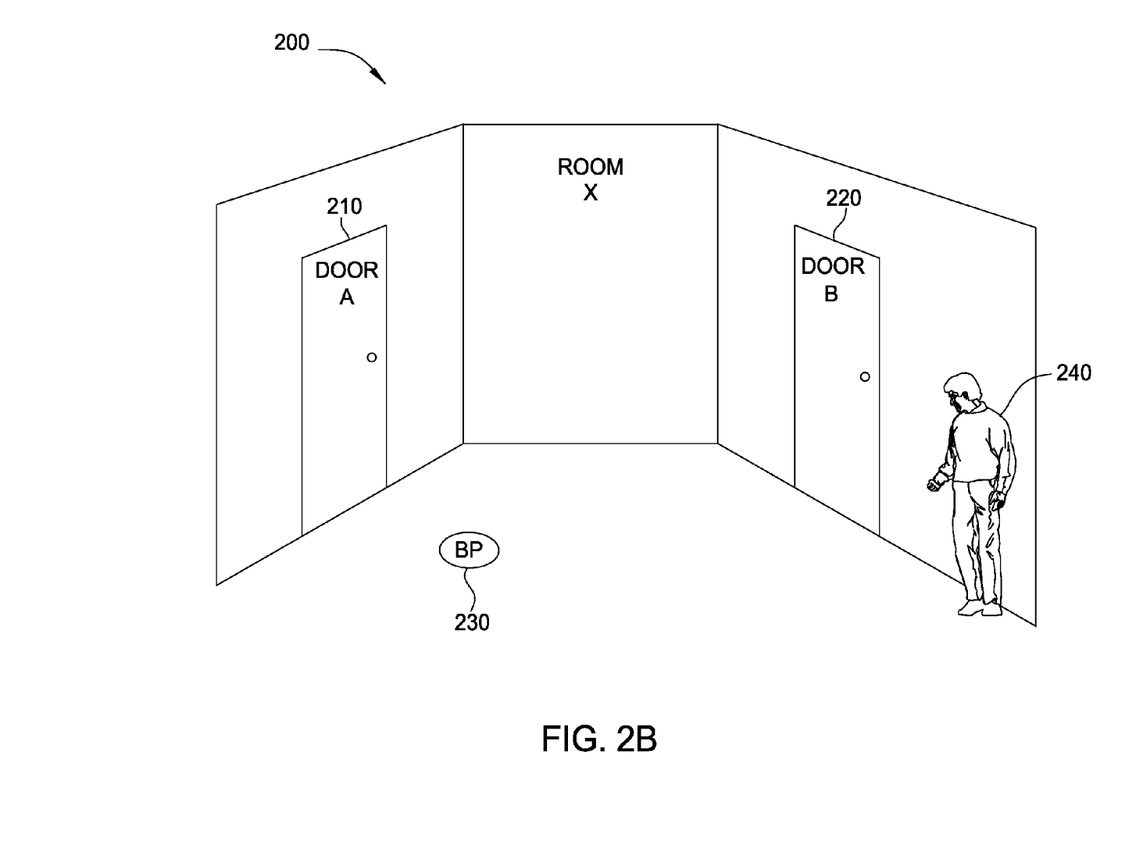
FIG. 2B illustrates an example scenario of identifying and presenting a breakpoint in a virtual world, according to one embodiment of the invention.

FIGS. 2A and 2B illustrate an example scenario of identifying and presenting a breakpoint 152 in a virtual world 146, according to one embodiment of the invention. Illustratively, FIG. 2A includes a "room X" with "door A", "door B", and an avatar 240. In one embodiment, the user may specify the criteria in the user profile 120 that triggers a breakpoint 152. For example, a user represented by avatar 240 may specify a lack of movement and clicking on objects as criteria for creating a breakpoint 152. Further, the user may specify thresholds for a given criteria. A threshold may be a minimum magnitude required for a breakpoint 152 to be created for some user activity (or inactivity). The breakpoint manager 150 may compare thresholds to the magnitude of an action that occurs in the virtual world 146. For example, for the breakpoints created based on a user clicking on an object, the magnitude may be the number of clicks on one object required before a breakpoint is created. Accordingly, a low threshold for the clicking on objects criteria could specify that one click is sufficient to trigger a breakpoint 152. Similarly, higher thresholds for the clicking on objects criteria may require greater numbers of clicks on a particular object to trigger breakpoints 152.

Because an avatar typically does not move continuously in a virtual world 146, a high threshold may be appropriate for the lack of movement criteria. Otherwise, with a low threshold, the breakpoint manager 150 may identify breakpoints 152 any time the avatar 240 hesitates, resulting in so many breakpoints that a user could not effectively use the breakpoints to return to a previous location. Suppose then, for the purposes of this example, that the user specifies a high threshold for the lack of movement criteria, and a low threshold for the clicking on objects criteria. In this example, the high threshold for the lack of movement criteria is thirty seconds and the low threshold for the clicking on objects criteria is one click. Of course, the metric for thresholds mentioned herein are merely examples for the purposes of description, and the actual settings may be tailored to suit the needs in a particular case.

For an example of creating a breakpoint, consider FIG. 2A. Suppose the user does not move avatar 240 from its position in front of "door A" for one minute, and then moves the avatar 240 to the position in front of "door B" shown in FIG. 2B. Because the magnitude (one minute) of the criteria (lack of movement) exceeds the threshold (i.e., more than thirty seconds), the breakpoint manager 150 may identify a breakpoint 152, capture the user context 148 (room X, doors A and B), and store a breakpoint 152 containing the user context 148.

FIG. 2B includes, in addition to the features described in FIG. 2A, a breakpoint icon 230. In one embodiment, the virtual world 146 may display an icon 230 in the position at which a breakpoint 152 is identified. FIG. 2B illustrates an icon 230 representing the breakpoint 152 described in FIG. 2A. According to one embodiment, a user may return the avatar 240 to the position indicated by icon 230 by simply clicking on icon 230. In response, the breakpoint manager 150 may retrieve the breakpoint 152 indicated by icon 230, and return avatar 240 to the position in front of "door A," as shown in FIG. 2A.

Assume the user clicks on "door B" (perhaps to have the avatar 240 knock on "door B"). Because clicking on objects is a criteria for identifying breakpoints 152, with a low threshold, the breakpoint manager 150 may identify a breakpoint 152 when the user clicks on "door B."

According to some embodiments, identifying breakpoints 152 may depend on the cumulative "size" of the criteria contained in user profile 120. In other words, after a user has specified criteria for identifying breakpoints 152 and thresholds for the respective criteria, the user may also specify how many of the criteria have to meet their respective thresholds before the breakpoint manager 150 identifies a breakpoint 152. In the example where the criteria are a lack of movement and clicking on objects, the user may specify that both criteria have to meet their thresholds before the breakpoint manager creates a breakpoint 152. In other words, the breakpoints 152 described in FIGS. 2A and 2B are only identified if the avatar does not move for at least thirty seconds, and during that time the user clicks on door "A" or door "B."

In one embodiment, the breakpoint size may be a cumulative calculation based on the magnitude of the breakpoint-triggering criteria. Instead of thresholds for the criteria, a user may specify the degree of influence a particular criteria has on the breakpoint size calculation. In other words, a lack of movement criteria with a high influence is more significant to the breakpoint size calculation than the clicking on objects criteria with a low influence. Further, the user may also specify a threshold for the breakpoint size. Accordingly, the breakpoint manager 150 identifies a breakpoint 152 only if the breakpoint size meets or exceeds the breakpoint size threshold.

Suppose then, that the user specifies that the breakpoint size threshold is low. Any lack of movement or clicking on objects by the avatar 240 may trigger a breakpoint 152. On the other hand, suppose the breakpoint size threshold is high. Triggering a breakpoint 152 may require a significant magnitude for the clicking on objects criteria, while only requiring a modest magnitude for the lack of movement criteria, because of the high influence of the lack of movement criteria and the low influence of the clicking on objects criteria. Of course, the breakpoint size calculation considers all criteria in the user profile, and appropriate combinations of the magnitudes of a lack of movement and clicking on objects may trigger a breakpoint 152.

Figure 3A:
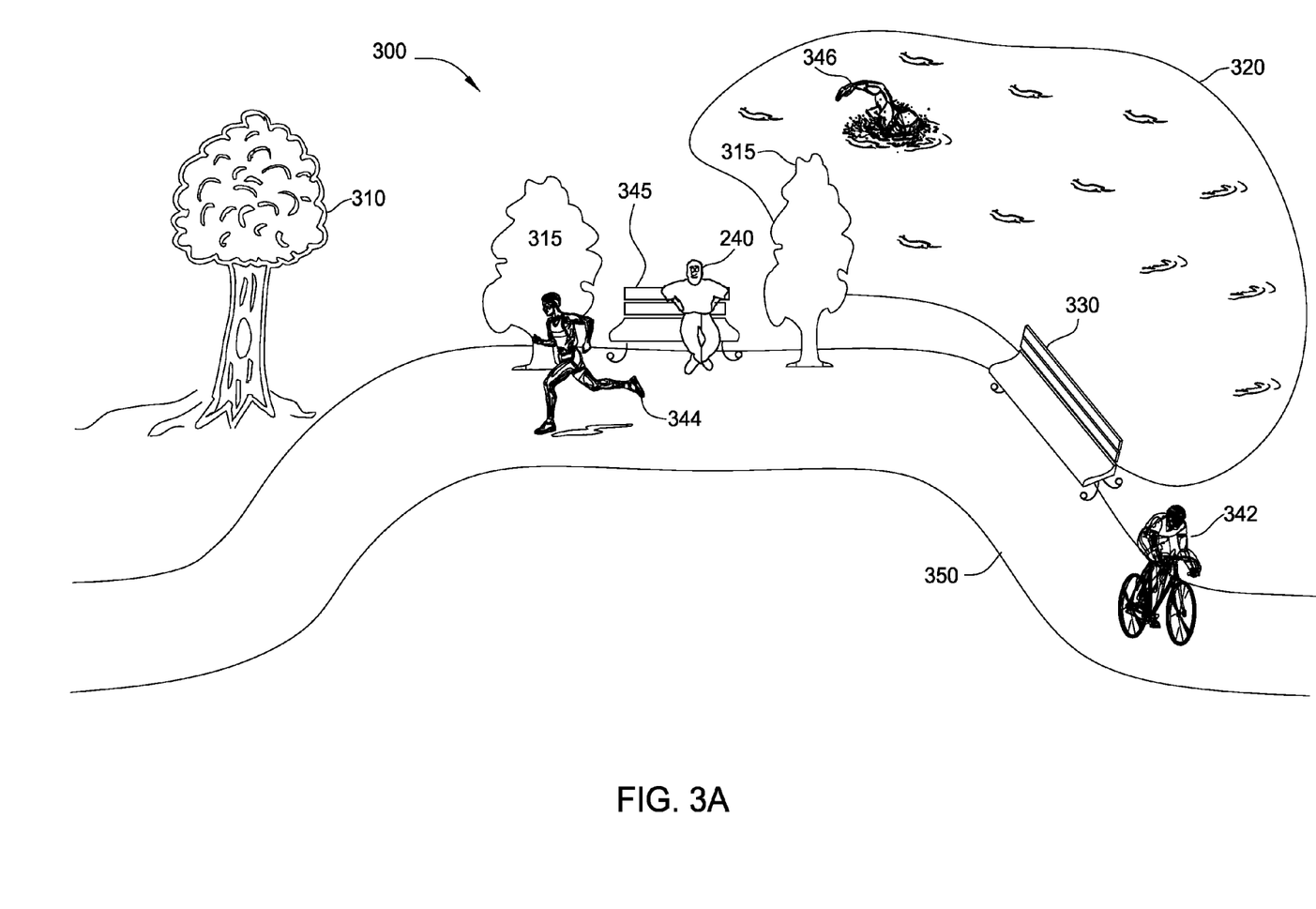
FIG. 3A illustrates an example scenario of identifying and presenting breakpoints in virtual worlds, according to one embodiment of the invention.
Figure 3B:
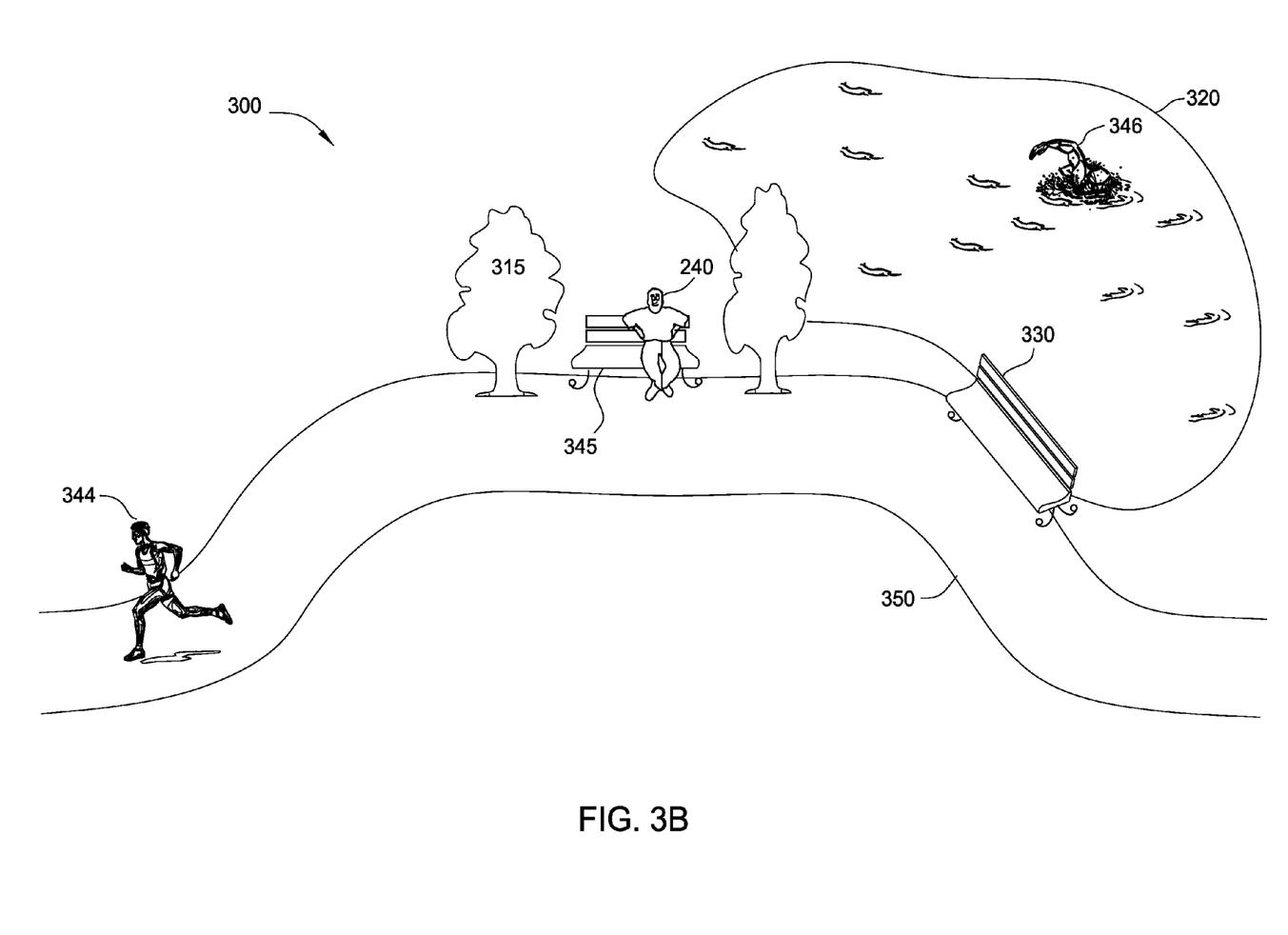
FIG. 3B illustrates an example scenario of identifying and presenting breakpoints in virtual worlds, according to one embodiment of the invention.

FIGS. 3A and 3B illustrate example scenarios of identifying and presenting breakpoints 152 in virtual worlds 146, according to one embodiment of the invention. The virtual location 300 (also referred to as virtual park 300) includes trees 310 and 315, a lake 320, benches 330 and 345, avatars 240, 342, 344, and 346, and a path 350.

Because virtual worlds 146 are fluid environments, the content of a particular location 300 may change in the time between the breakpoint manager's 150 creating the breakpoint 152, and the user's 240 restoring the breakpoint 152.

Accordingly, in one embodiment, the user may restore a breakpoint 152 either statically or dynamically. In an example of a dynamic restore, assume a user clicks on the bench 345 to sit the avatar 240 down. Because clicking on objects is a criteria with a low threshold for creating breakpoints 152, the breakpoint manager 150 identifies a breakpoint 152 at the moment the park 300 appears as depicted in FIG. 3A, and stores the breakpoint 152.

The avatar 240 may then leave the virtual park 300 by restoring a breakpoint 152 for "room X," as described in FIG. 2A. In a persistent virtual world 146, the virtual park 300 may change to appear as illustrated in FIG. 3B.

FIG. 3B depicts the virtual park 300 after the avatar 240 restores a breakpoint 152 back to the virtual park 300, dynamically. The park 300 is changed from the moment that the bench-click breakpoint 152 was created and the park 300 appeared as illustrated in FIG. 3A. For example, the avatar 342, formerly on the path 350 has left the virtual park 300. The avatars 344 and 346 have changed positions. The avatar 344 has moved further along the path 340, and the avatar 346 has swum further across the lake 320. Additionally, the tree 310 has disappeared. It may be that another avatar cut down the tree and took it away. Because the avatar 240 was not here, it may be impossible to know what happened to the tree 310.

While the park 300 has changed in the time before the avatar 240 restores the breakpoint for the park 300, the user may again view the park 300 as illustrated in FIG. 3A by restoring the bench-click breakpoint 152 statically. In some embodiments, statically restoring a breakpoint 152 allows a user to see a virtual location 300 as if a snapshot of the location 300 is taken at the moment the breakpoint 152 is identified. In this example, by restoring the breakpoint 152 to the park 300 statically, the user may view the park 300 as depicted in FIG. 3A. However, because the virtual world 146 has actually changed, the virtual world 146 may prohibit an avatar's 240 interaction in a virtual location 300 after restoring a breakpoint 152 statically. Further, after a static restore, the virtual world 146 may require a user to "resume" the avatar's 240 presence in the virtual location 300 before allowing the avatar 240 to interact in the virtual world 146 again.

Figure 4A:
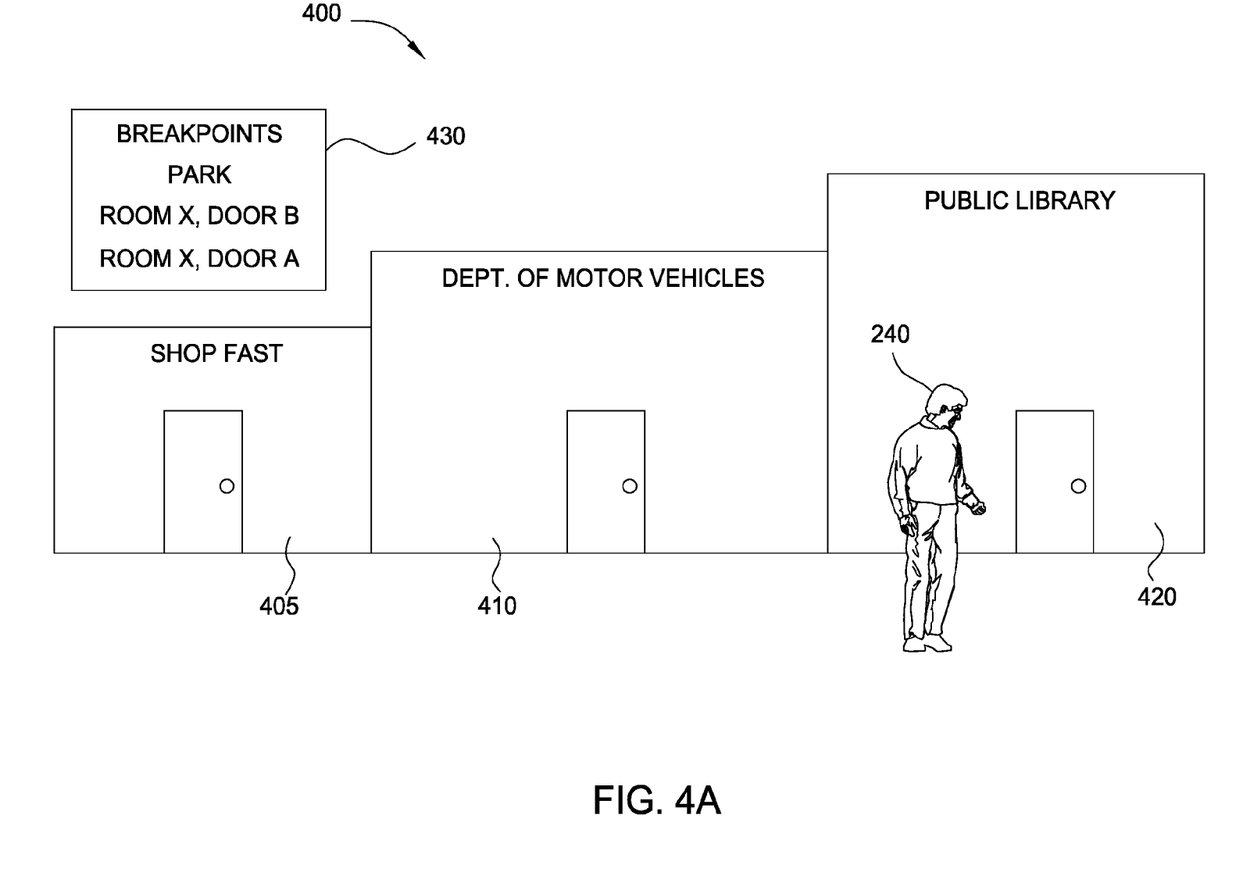
FIG. 4A illustrates an example scenario of presenting breakpoints available to a user in virtual worlds, according to one embodiment of the invention.
Figure 4B:
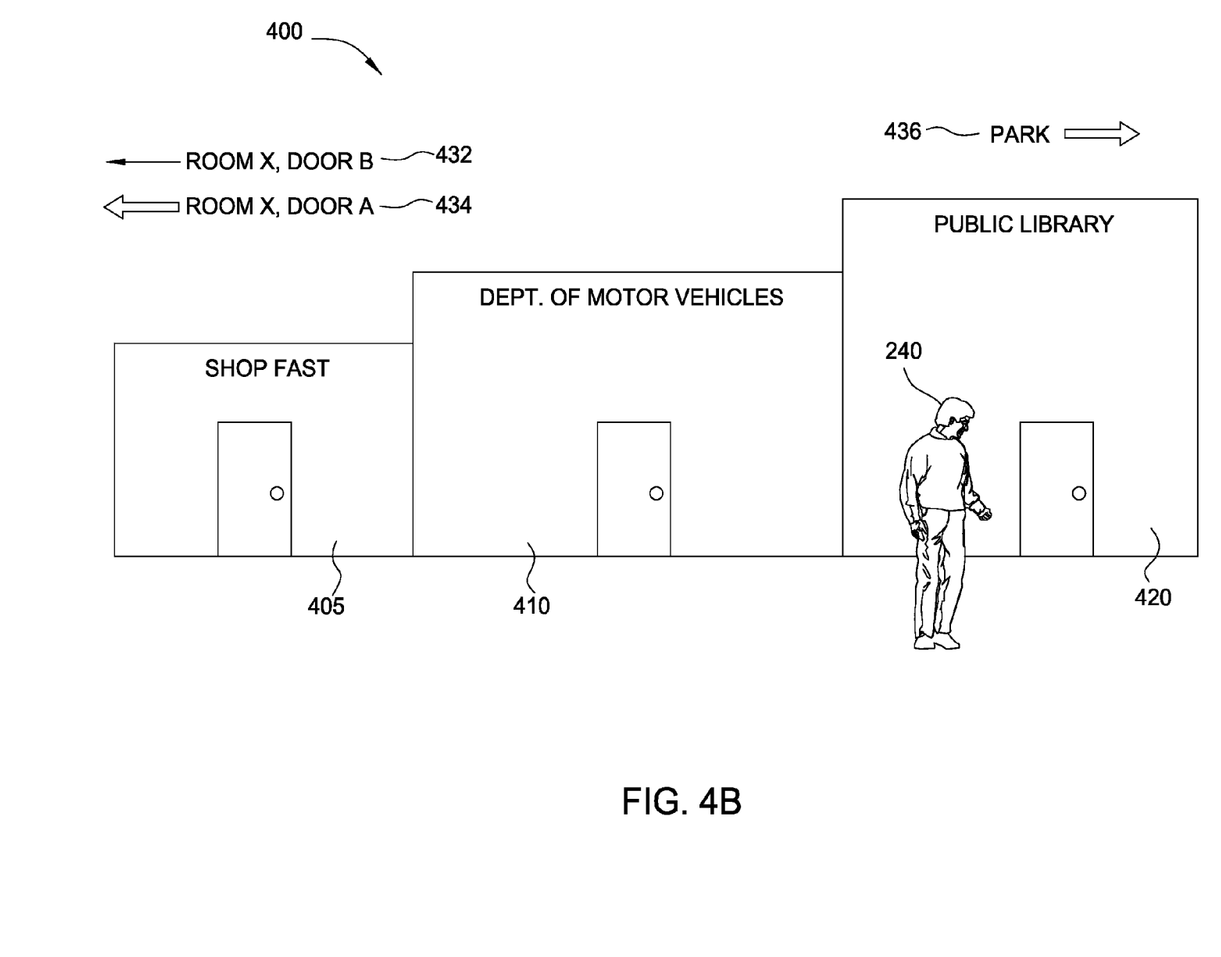
FIG. 4B illustrates an example scenario of presenting breakpoints available to a user in virtual worlds, according to one embodiment of the invention.

FIGS. 4A and 4B illustrate example scenarios of presenting breakpoints 152 available to a user in virtual worlds 146, according to one embodiment of the invention. In FIG. 4A, the virtual location 400 depicts a virtual city street, and includes a virtual store 405, a virtual DMV 410, a virtual public library 420, a breakpoint list 430, and avatar 240.

The breakpoint list 430 shows all the breakpoints 152 available to the avatar 240 (described in FIGS. 2A, 2B, 3A, and 3B). In one embodiment, a user may invoke the breakpoint list 430 display by right-clicking a mouse or using some other form of interaction with virtual world 146. The breakpoint list 430 contains three breakpoints 152, "PARK," "ROOM X, DOOR B," and "ROOM X, DOOR A." In this example, the breakpoints 152 are listed in reverse chronological order, but could be presented in various sequences depending on the details of an implementation. Further, the number of breakpoints presented in list 430 may be limited to a pre-determined number to avoid screen clutter.

In one embodiment, the breakpoint manager 150 may present the breakpoint list 430 by sequencing breakpoints 152 by size, as described in FIGS. 2A and 2B. In other words, a pre-determined number of breakpoints 152 would appear sorted by breakpoint sizes. As stated, a breakpoint size may be used to indicate the significance of a particular breakpoint 152. Consider the example with breakpoint criteria of lack of movement, and clicking on an object. If the user both stands before an item for a long enough time to trigger a breakpoint 152, and clicks on the object, it could mean that a breakpoint is more significant than if the user merely clicked on the object or only stood before an object long enough to trigger a breakpoint 152. Further, a breakpoint 152 created because an avatar does not move for a minute may be more significant than a breakpoint 152 created because an avatar does not move for only thirty seconds. The longer wait may indicate a greater interest in a virtual location, or an object near the avatar when the breakpoint 152 is created.

FIG. 4B depicts the same location shown in FIG. 4A; however, instead of a breakpoint list 430, FIG. 4B illustrates available breakpoints 432, 434, and 436. According to one embodiment, the available breakpoints 152 may be displayed persistently on screen, positioned so as to indicate the relative direction to a given breakpoint 152 from the current location 400. As shown in FIG. 4B, both breakpoints 152 for "ROOM X," appear on the left side of the screen, indicating to the user that "ROOM X" is to the avatar's 240 left. Similarly, the breakpoint 152 for the "PARK" appears on the right side of the screen, indicating to the user that the park is on the avatar's 240 right. Visual clues such as these may assist the user in understanding the meaning of a particular breakpoint and in navigating through the virtual world 146. Similarly, the breakpoint manager 150 may present the breakpoints 152 in a font size proportionate to the breakpoint size. As shown in FIG. 4B, the size of the arrow for the breakpoint "ROOM X, DOOR B," is smaller than the arrow for breakpoint "ROOM X, DOOR A," indicating a greater breakpoint size for "ROOM X, DOOR A" than "ROOM X, DOOR B." Breakpoints can also be visually represented by thumbnail images of the screen taken at the time of the breakpoint.

Figure 5A:
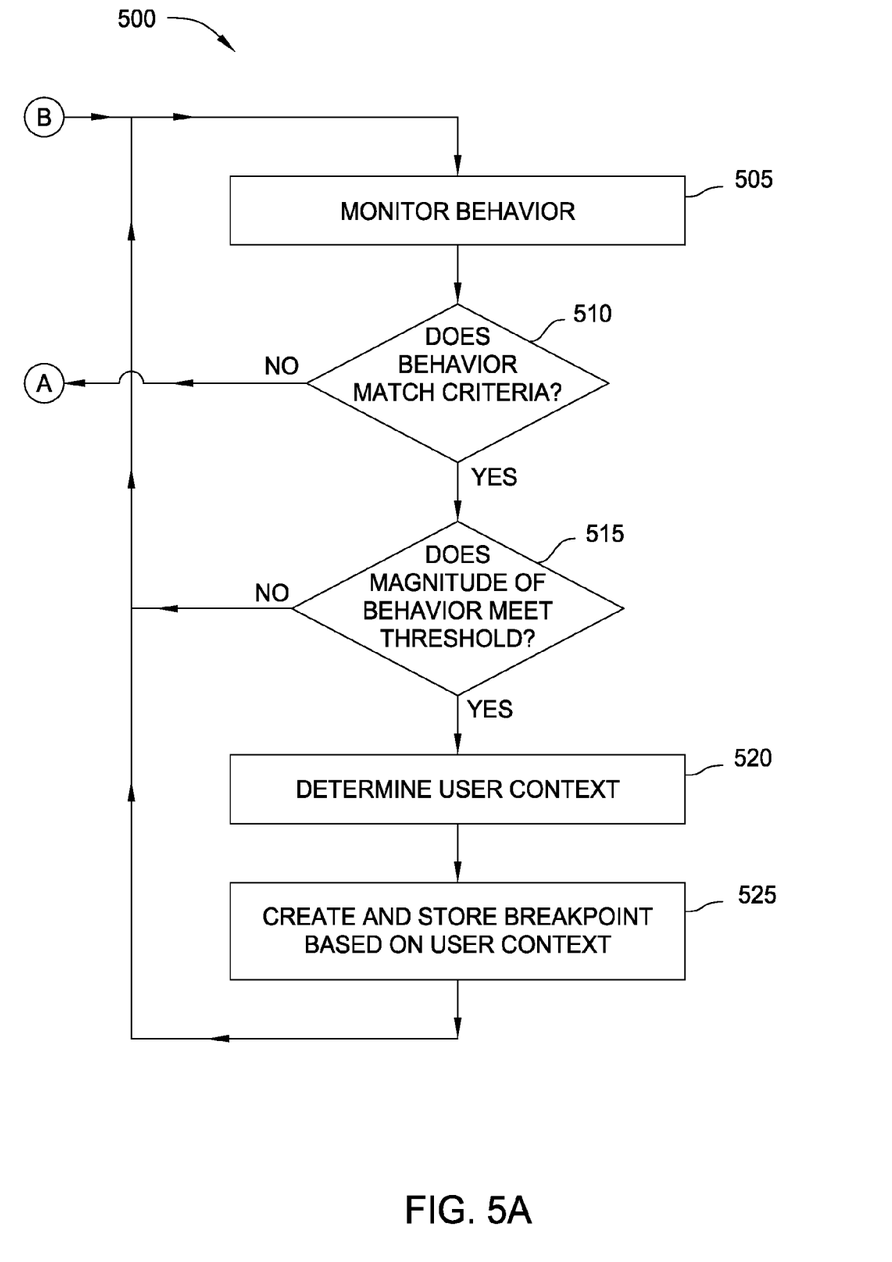
FIG. 5A is a flowchart depicting a process for creating breakpoints, according to one embodiment of the invention.

FIG. 5A is a flowchart illustrating a process 500 for creating breakpoints 152, according to one embodiment of the invention. At step 505, the breakpoint manager 150 monitors the behavior of a given avatar. At step 510, the breakpoint manager 150 may compare the avatar's behavior to the criteria stored in the user profile 120 associated with that avatar. If the avatar's behavior does not match the criteria in user profile 120, the process continues with the process at pointer "A," which is described in detail in FIG. 5B.

If the avatar's behavior matches the criteria in the user profile 120, at step 515, the breakpoint manager 150 compares the magnitude of the avatar's behavior to the threshold (s) for the matching criteria in the user profile 120. If the magnitude meets or exceeds the threshold, at step 520, the breakpoint manager determines the current user context 148 for the newly identified breakpoint 152.

Using the avatar with in the virtual park 300 shown in FIG. 3, the user context 148 includes all the objects (trees 310 and 315, the lake 320, the benches 330 and 345, and the path 350) and avatars 342, 344, and 346 in the park. After capturing the context 148, at step 525, the breakpoint manager 150 may store a breakpoint 152 based on the user context identified at step 520. The process 500 then returns to step 505.

Figure 5B:
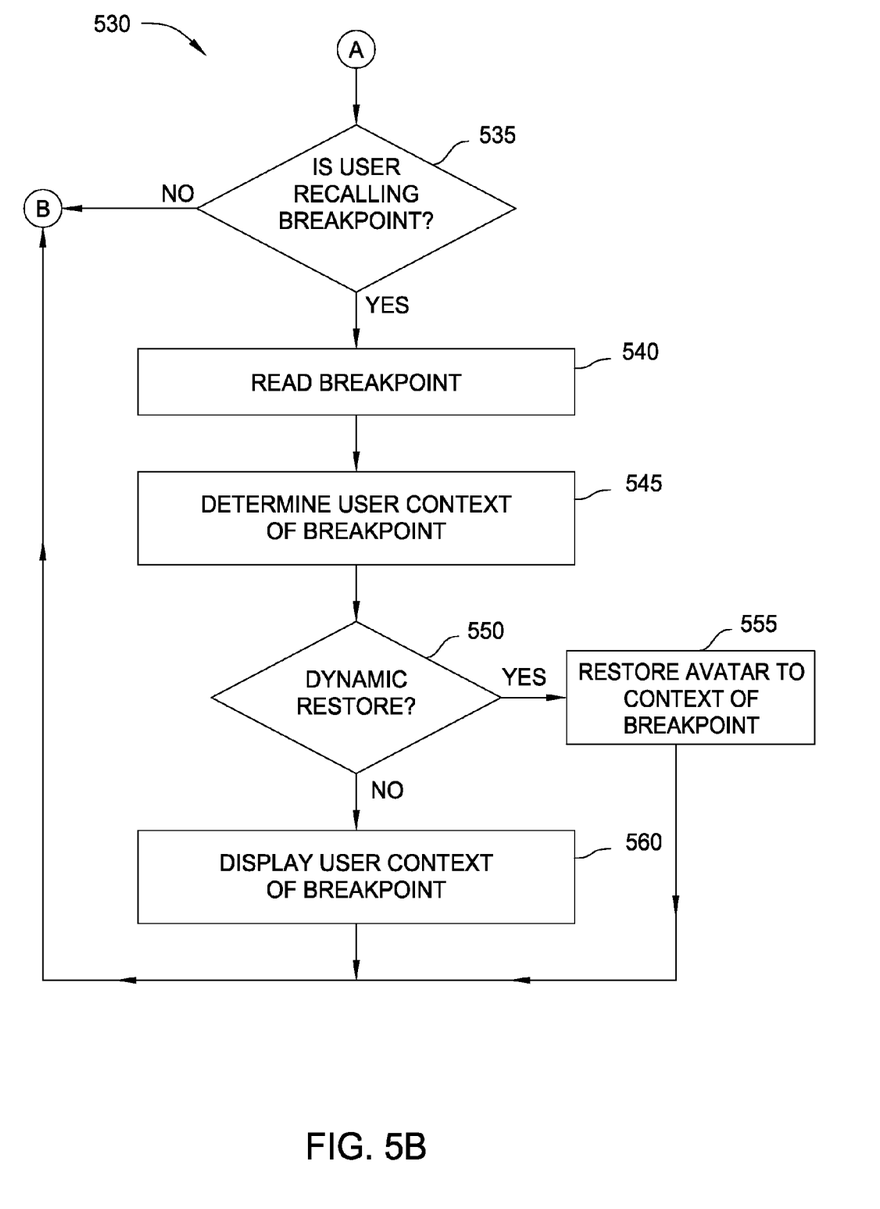
FIG. 5B is a flowchart depicting a process for restoring a breakpoint, according to one embodiment of the invention.

FIG. 5B is a flowchart illustrating a process 530 for restoring a breakpoint 152, according to one embodiment of the invention. Process 530 flows from step 510 of the process 500 described in FIG. 5A. At step 535, the breakpoint manager 150 may determine whether the user has requested to restore a given breakpoint 152. If not, the process 530 continues to the process 500 at pointer "B," which returns to the behavior monitoring process described in FIG. 5A.

If the user requests to restore a breakpoint 152, then at step 540, the breakpoint manager 150 retrieves the breakpoint 152 from storage 140. At step 545, the breakpoint manager 150 determines the user context 148 of the breakpoint 152, recalling the details of a virtual location, e.g. park 300, stored for the breakpoint 152. At step 550, the breakpoint manager 150 determines whether the user has requested the breakpoint to be restored dynamically. If not, the breakpoint manager 150 may display a snapshot of the virtual location 300, as captured at the time the breakpoint 152 was created. The process 530 then returns to the behavior monitoring process described in FIG. 5A.

Otherwise, if the user requested the breakpoint to be restored dynamically, then the breakpoint manager sends the user context 148 to the virtual world 146. In response, the virtual world 146 may return the user's avatar 240 to the location captured at the time the breakpoint 152 was created. For example, to dynamically restore, the virtual world 146 using the breakpoint created while the user's avatar was sitting on the pack bench, the virtual world may return the avatar

240 to the virtual park 300, resulting in a scene displayed to the user like that depicted in FIG. 3B.

In one embodiment, the breakpoint manager 150 may modify the criteria stored in the user profile 120 to reflect a user's preferences for restoring a breakpoint 152. In the example where lack of movement and clicking on objects are the criteria for creating a breakpoint, the user may exclusively restore breakpoints that are identified in response to the user's clicking on objects. In such a case, the breakpoint manager 150 may modify the influence of the criteria, changing the influence of the clicking on objects criteria to high, and the lack of movement criteria to low. Alternately, the breakpoint manager 150 may remove the lack of movement criteria from the user profile 120 altogether. Of course, one of ordinary skill in the art will recognize that many different permutations for modifying criteria may be useful in a particular case.

Advantageously, embodiments of the invention may be used to enhance a user's experience interacting with a virtual world. By capturing breakpoints that reflect some significant interaction with the virtual world, a user may restore their avatar to the location a given breakpoint was captured. Further, the restore may be dynamic or static, returning the user to another location in the virtual world, or presenting the user with a "snapshot" of the virtual world recorded when the breakpoint was created. By providing a flexible set of criteria used to specify when breakpoints are set within the virtual environment, users can customize the breakpoint generation process to suit their needs.

While the foregoing is directed to embodiments of the present invention, other and further embodiments of the invention may be devised without departing from the basic scope thereof, and the scope thereof is determined by the claims that follow.

What is claimed is:

1. A method of creating a breakpoint associated with an avatar in a virtual world, comprising:
   retrieving a user profile associated with the avatar, wherein the user profile specifies criteria for setting a breakpoint, wherein the criteria for setting the breakpoint is customizable by a user associated with the user profile;
   monitoring activity of the avatar in the virtual world to determine if the criteria is satisfied, wherein the virtual world is simultaneously populated by a plurality of avatars controlled by a plurality of users, and wherein the virtual world is persistent such that the virtual world provides an immersive environment regardless of the presence of the avatar in the virtual world; and
   upon determining that the criteria is satisfied:
      capturing a then existing location of the avatar within the virtual world and a context of one or more elements proximate to the avatar present in the virtual world; and
      storing the then existing location of the avatar within the virtual world and the context of one or more elements present in the virtual world for the breakpoint;
   receiving a request from the user to access the breakpoint, wherein the request permits the user to choose between dynamically or statically restoring the breakpoint;
   when the request specifies to dynamically restore the breakpoint, returning the avatar to the location stored for the breakpoint wherein a current context of one or more elements proximate to the avatar when the avatar is returned to the location is different from the captured context; and
   when the request specifies to statically restore the breakpoint, generating an image of the virtual world representing the then existing location of the avatar within the virtual world stored for the breakpoint and the context of one or more elements present in the virtual world, wherein the avatar is prohibited from interacting with the virtual world.

2. The method of claim 1, wherein the criteria is a at least one of: the avatar not moving during a defined period of time, the user interacting with an object in the virtual world and a communication between the user and the plurality of users.

3. The method of claim 1, further comprising:
   after statically restoring the breakpoint, receiving a different request to dynamically restore the breakpoint; and
   after dynamically restoring the breakpoint in response to the different request, permitting the avatar to interact with the virtual world.

4. The method of claim 1, further comprising:
   generating a plurality of breakpoints; and
   presenting the user with a list of the plurality of breakpoints.

5. The method of claim 1, wherein the criteria specify one or more thresholds respectively associated with the criteria.

6. The method of claim 5, wherein the criteria further specify one or more magnitudes of behavior describing an intensity of the behavior necessary to satisfy the criteria.

7. A computer-readable storage medium containing a program configured to perform an operation for creating a breakpoint associated with an avatar in a virtual world, the operation comprising:
   retrieving a user profile associated with the avatar, wherein the user profile specifies criteria for setting a breakpoint, wherein the criteria for setting the breakpoint is customizable by a user associated with the user profile;
   monitoring the activity of the avatar in the virtual world to determine if the criteria is satisfied, wherein the virtual world is simultaneously populated by a plurality of avatars controlled by a plurality of users, and wherein the virtual world is persistent such that the virtual world provides an immersive environment regardless of the presence of the avatar in the virtual world; and
   upon determining that the criteria is satisfied:
      capturing a then existing location of the avatar within the virtual world and a context of one or more elements proximate to the avatar present in the virtual world; and
      storing the then existing location of the avatar within the virtual world and the context of one or more elements present in the virtual world for the breakpoint;
   receiving a request from the user to access the breakpoint, wherein the request permits the user to choose between dynamically or statically restoring the breakpoint;
   when the request specifies to dynamically restore the breakpoint, returning the avatar to the location stored for the breakpoint wherein a current context of one or more elements proximate to the avatar when the avatar is returned to the location is different from the captured context; and
   when the request specifies to statically restore the breakpoint, generating an image of the virtual world representing the then existing location of the avatar within the virtual world stored for the breakpoint and the context of one or more elements present in the virtual world, wherein the avatar is prohibited from interacting with the virtual world.

8. The computer-readable storage medium of claim 7, wherein the operation further comprises, presenting an indication of the location of the breakpoint within the virtual world to the user.

9. The computer-readable storage medium of claim 7, wherein the operation further comprises:
  after statically restoring the breakpoint, receiving a different request to dynamically restore the breakpoint; and
  after dynamically restoring the breakpoint in response to the different request, permitting the avatar to interact with the virtual world.

10. The computer-readable storage medium of claim 7, wherein the operation further comprises:
  generating a plurality of breakpoints; and
  presenting the user with a list of the plurality of breakpoints.

11. The computer-readable storage medium of claim 7, wherein the criteria specify one or more thresholds respectively associated with the criteria.

12. The computer-readable storage medium of claim 11, wherein the criteria further specify one or more magnitudes of behavior describing an intensity of the behavior necessary to satisfy the criteria.

13. A system for creating a breakpoint associated with an avatar in a virtual world, comprising:
  a processor; and
  a memory that stores:
    a virtual world program, which when executed on the processor, is configured to:
      generate the virtual world that defines a virtual space configured to allow a plurality of avatars controlled by a plurality of users to simultaneously interact with content elements included in the virtual world and with one another, and wherein the virtual world is persistent such that the virtual world provides an immersive environment regardless of the presence of the avatar in the virtual world, and wherein a user profile associated with the avatar specifies criteria for setting a breakpoint for the avatar, wherein the criteria for setting the breakpoint is customizable by a user associated with the user profile; and
    a breakpoint manager program, which when executed on the processor, is configured to:
      retrieve the user profile associated with the avatar,
      monitor activity of the avatar in the virtual world to determine if the criteria is satisfied,
      upon determining that the criteria is satisfied:
        capture a then existing location of the avatar within the virtual world and a context of one or more elements proximate to the avatar present in the virtual world, and
        store the then existing location of the avatar within the virtual world and the context of one or more elements present in the virtual world,
      receive a request from the user to access the breakpoint, wherein the request permits the user to choose between dynamically or statically restoring the breakpoint,
      when the request specifies to dynamically restore the breakpoint, return the avatar to the location stored for the breakpoint wherein a current context of one or more elements proximate to the avatar when the avatar is returned to the location is different from the captured context, and
      when the request specifies to statically restore the breakpoint, generate an image of the virtual world representing the then existing location of the avatar within the virtual world stored for the breakpoint and the context of one or more elements present in the virtual world, wherein the avatar is prohibited from interacting with the virtual world.

14. The system of claim 13, wherein the virtual world program is further configured to present an indication of the location of the breakpoint within the virtual world to the user.

15. The system of claim 13, wherein the virtual world program is further configured to:
  after statically restore the breakpoint, receiving a different request to dynamically restore the breakpoint; and
  after dynamically restoring the breakpoint in response to the different request, permitting the avatar to interact with the virtual world.

16. The system of claim 13, wherein the virtual world program is further configured to:
  generate a plurality of breakpoints; and
  present the user with a list of the plurality of breakpoints.

17. The system of claim 13, wherein the criteria specify one or more thresholds respectively associated with the criteria.

18. The system of claim 17, wherein the criteria further specify one or more magnitudes of behavior describing an intensity of the behavior necessary to satisfy the criteria.

19. A method for enabling a computer to create a break point associated with an avatar in a virtual world, comprising transmitting computer readable program code to a computing system, wherein the computer readable program code in combination with the computing system is adapted to perform the method of claim 1.

20. The method of claim 19, further comprising:
  storing the program code in an internet accessible storage media; and
receiving a request from the program code from a computing device, wherein the transmitting occurs in response to the request.

21. The method of claim 1, wherein at least one of the criteria for setting the breakpoint is the avatar not moving during a defined period of time.

22. The computer-readable storage medium of claim 7, wherein at least one of the criteria for setting the breakpoint is the avatar not moving during a defined period of time.

23. The system of claim 13, wherein at least one of the criteria for setting the breakpoint is the avatar not moving during a defined period of time.

* * * * *